(12) United States Patent
Østberg

(10) Patent No.: US 11,806,705 B2
(45) Date of Patent: Nov. 7, 2023

(54) CATALYTIC REACTOR COMPRISING METAL RADIATION SURFACES

(71) Applicant: HALDOR TOPSØE A/S, Kgs. Lyngby (DK)

(72) Inventor: Martin Østberg, Tune (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 52 days.

(21) Appl. No.: 17/051,298

(22) PCT Filed: Jun. 24, 2019

(86) PCT No.: PCT/EP2019/066591
§ 371 (c)(1),
(2) Date: Oct. 28, 2020

(87) PCT Pub. No.: WO2020/002188
PCT Pub. Date: Jan. 2, 2020

(65) Prior Publication Data
US 2021/0362114 A1    Nov. 25, 2021

(30) Foreign Application Priority Data

Jun. 28, 2018    (DK) .................. PA 2018 00305

(51) Int. Cl.
*B01J 8/06* (2006.01)
*B01J 19/24* (2006.01)

(52) U.S. Cl.
CPC .......... *B01J 8/062* (2013.01); *B01J 19/2415* (2013.01); *B01J 2208/065* (2013.01); *B01J 2219/2416* (2013.01)

(58) Field of Classification Search
CPC ...... B01J 8/062; B01J 8/067; B01J 2208/065; B01J 19/2415; B01J 2219/2416
See application file for complete search history.

(56) References Cited

U.S. PATENT DOCUMENTS

| | | | | |
|---|---|---|---|---|
| 3,129,065 A | * | 4/1964 | Koniewiez | B01J 8/065 422/204 |
| 3,270,798 A | * | 9/1966 | Ruff | F23D 14/18 431/329 |
| 4,098,588 A | * | 7/1978 | Buswell | B01J 8/02 165/142 |

(Continued)

FOREIGN PATENT DOCUMENTS

| | | |
|---|---|---|
| DE | 29721686.4 U1 | 1/1998 |
| EP | 1604706 A2 | 12/2005 |

(Continued)

OTHER PUBLICATIONS

International Search Report (PCT/ISA/210) and Written Opinion (PCT/ISA/237) dated Oct. 9, 2019, by the European Patent Office as the International Searching Authority for International Application No. PCT/EP2019/066591.

(Continued)

*Primary Examiner* — Lessanework Seifu
(74) *Attorney, Agent, or Firm* — Boone IP Law

(57) ABSTRACT

The invention relates to a catalytic reactor comprising a combustion reaction chamber with catalytic reactor tubes filled with catalyst elements and metal radiation surfaces arranged in the chamber to improve heat transfer.

2 Claims, 1 Drawing Sheet

(56) References Cited

U.S. PATENT DOCUMENTS

| | | | |
|---|---|---|---|
| 4,495,154 | A | 1/1985 | Christner et al. |
| 4,847,051 | A | 7/1989 | Parenti |
| 5,408,984 | A | 4/1995 | Maughan |
| 8,603,201 | B2 | 12/2013 | Tsuchida et al. |
| 2009/0094894 | A1 | 4/2009 | Genkin et al. |
| 2010/0278700 | A1* | 11/2010 | Clawson ............... B01J 8/062 422/198 |
| 2013/0334465 | A1 | 12/2013 | Zhao et al. |
| 2013/0343985 | A1 | 12/2013 | Krueger et al. |
| 2014/0369897 | A1 | 12/2014 | Verykios et al. |
| 2015/0048277 | A1* | 2/2015 | Volpi ..................... B01J 7/00 252/373 |

FOREIGN PATENT DOCUMENTS

| | | |
|---|---|---|
| EP | 2708812 A1 | 3/2014 |
| EP | 2774668 A1 | 9/2014 |
| EP | 2830994 B1 | 8/2018 |
| RU | 2485087 C2 | 6/2013 |
| RU | 2664526 C2 | 8/2018 |
| WO | 2011137522 A1 | 11/2011 |
| WO | 2016097454 A1 | 6/2016 |

OTHER PUBLICATIONS

Search Report dated Dec. 5, 2018, by the Danish Patent Office for Application No. PA 2018 00305.

* cited by examiner

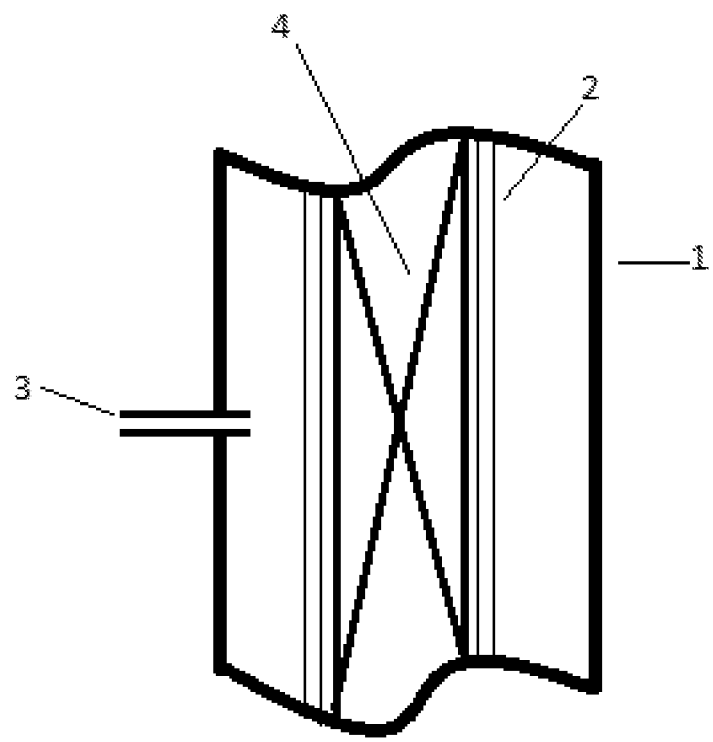

CATALYTIC REACTOR COMPRISING METAL RADIATION SURFACES

FIELD OF THE INVENTION

Embodiments of the invention generally relate to a catalytic reactor with catalytic reactor tubes and more specifically to a catalytic reactor comprising metal radiation surfaces provided in a combustion chamber of the catalytic reactor, which improve the heat transfer and/or even the heat transfer profile from the combustion reaction to the catalytic reactor tubes and the catalyst elements during operation of the catalytic reactor.

BACKGROUND

In catalytic reactors the chemical process often requires heating or cooling of the catalyst bed for the chemical process to run or at least to run feasible. A limiting factor is the heat transfer between the process fluid flowing through the catalyst bed and the burner flame(s) arranged adjacent to the outside of container of the catalyst bed to provide heat to the chemical process. In many cases, the catalyst is contained in catalytic reactor tubes with process fluid flowing within the catalytic reactor tubes through the catalyst bed. The catalytic reactor tubes are then heated on the outside to transfer heat to the catalyst. An increase of the heat transfer from the heat source, often a burner flame, to the catalytic reactor tubes will thus increase the efficiency and yield of the chemical process in each catalytic reactor tube and in the catalytic reactor as a whole. Furthermore, the efficiency will be increased if the local heat from a burner flame is evened out to provide well distributed heat transfer to the catalytic reactor tubes. In most cases, the catalytic reactor comprises a plurality of catalytic reactor tubes. As catalytic reactors have a considerable cost, an increase in the efficiency of each catalytic reactor tube in the catalytic reactor has a direct influence in lowering the cost, material consumption and energy consumption for producing a given amount of chemical products in the catalytic reactor.

Known art offers little solution to this problem, as can be seen in the following references, where:

EP1604706 discloses a flame arresting article comprising a body of expanded net formed by longitudinally stretching slitted sheets of metal foil, said metal foil having a thickness in the range of 0.020 to 0.1 mm and having discontinuous slits (11) in parallel lines which are spaced apart 2 50 5 mm. The metal foil is an alloy of magnesium and at least one metal selected from the group consisting of aluminium, copper, zirconium, zinc, strontium, Rn (electron), silicon, titanium, iron, manganese, and chromium, there being at least 0.05 percent magnesium by weight. The invention also relates to the associated method of arresting flames.

U.S. Pat. No. 5,408,984 describes a gas burner which employs a two stage flame stabilizer. At low input rates, a fully aerated flame is stabilized at the surface of a porous material. At higher input rates, the flame blows off and is held by flame stabilization tabs. Such structures of this type, generally, operate over a very wide range of input rates and employ a highly aerated flame which reduces the flame temperature, slows NOx production, and increases the overall reaction rate by shortening the flame while reducing carbon monoxide (CO) caused by flame impingement.

None of the above known art references offer a solution to the mentioned problem as described in the following.

In the following, tubes shall be construed as enclosures of any cross sectional shape, only characterized by being longer than the cross sectional distance. Typically, tubes are cylindrical, but they may also have non-circular cross sectional shapes and varying cross sectional shape over the tube length.

SUMMARY OF THE INVENTION

Embodiments of the invention generally relate to a catalytic reactor comprising a combustion reaction chamber which comprises a plurality of catalytic reactor tubes. The catalytic reactor tubes are at least partly filled with catalyst elements to provide for a chemical reaction to take place in the catalytic reactor tubes when process fluid streams through them. To provide the necessary heat for the chemical reaction to take place, the catalytic reactor also comprises at least one burner enabled to produce a combustion reaction, providing heat to the catalytic reactor tubes for the chemical reaction to take place.

Within the combustion reaction chamber, one or more metal radiation surfaces are arranged between the catalytic reactor tubes. The metal radiation surfaces have several advantages. They absorb heat energy from the combustion reaction of the burner(s) and emit this as radiation with a higher effect than a gaseous species (gas radiation). They may act as flame attachment surfaces, controlling the burner flames, thus helping preventing flame attachment to reformer tubes which may cause hot spots which damage the catalytic reactor tubes. Furthermore, the metal radiation surfaces will conduct the heat from the burner(s), thereby distributing the heat radiation to a larger area, evening the temperature of the reformer tubes. This may open for a production increase (higher through-put on the process side) as the radiation input to the tubes could be modified eliminating the high temperature areas normally seen caused by the radiation from the burner flames. The metal radiation surfaces have a length of at least half the length of the catalytic reactor tubes to provide sufficient area for the mentioned advantages.

The metal radiation surfaces are arranged with at least a part of their surface in a distance from the burner sufficiently small to enable the mentioned heat absorption from the combustion reaction. This distance may vary according to the specific setup of the application, it is adapted to the heat output from the burner(s), to the distance between the burner(s) and the catalytic reactor tubes, the distance between the reactor tubes and in case of a plurality of burners, to the distance between the burners. In a one embodiment, the metal radiation surfaces are arranged so near the burner(s) that the burner flame will make a flame attachment to the radiation surfaces, i.e. the direction and location of the burner flame(s) are guided by the metal radiation surfaces. In a specific embodiment, the metal radiation surfaces are actually arranged within the flame of at least one of the burners.

As already described, the metal radiation surfaces improve the heat transfer from the burner(s) to the catalytic reactor tubes and even out the heat transfer profile from the combustion reaction to the catalytic reactor tubes (and thereby to the catalyst elements within the catalytic reactor tubes) during operation of the catalytic reactor.

In one embodiment of the invention, the metal radiation surfaces are made of a woven metal. In a further embodiment, they are made of a metal gauze or metal plates. In a specific embodiment of the invention the metal radiation surfaces are made of a Kanthal metal gauze. The metal threads of the woven metal or metal gauze may have a cross sectional diameter of 50 µm to 1 mm, preferably between 50 µm and 100 µm.

In a further embodiment of the invention, the metal radiation surfaces have a length of 80% to 100% of the length of the catalytic reactor tubes, to further improve the heat transfer and even the heat transfer profile as mentioned.

In an embodiment of the invention, the metal radiation surfaces are arranged as curtains in the combustion reaction chamber, attached in the chamber at their top and bottom. This embodiment is particularly efficient when the burner(s) are top mounted or bottom mounted in the combustion reaction chamber.

To further improve the efficiency of the process and make the combustion process more environmental friendly, the metal radiation surfaces may be made of or coated with a catalytic active material. This can increase oxidation of unburned fuel especially carbon monoxide. For example, this approach is applicable to a HiCOT reformer furnace as it will allow use of HiCOT burners to be used on box reformers. This will enable to make a reformer furnace with lower NOx formation as the average combustion temperature in the furnace will be lowered.

In an embodiment of the invention, one or more metal radiation surfaces are arranged within one, more or all the catalytic reactor tubes. The metal radiation surfaces are shaped to fit and be in physical contact with the inner surface of the catalytic reactor tubes in at least a part of the inner circumference of the one or more catalytic reactor tubes. Thus, the metal radiation surfaces are arranged within the catalytic reactor tubes, around the catalyst elements, between the catalyst elements and the catalytic reactor tubes inner surface. The weight and pressure of the catalyst elements contributes to the physical contact between the inner surface of the catalytic reactor tubes and the metal radiation surfaces. The process fluid flowing within the catalytic reactor tubes, through the catalyst bed, receives heat from the catalytic reactor tube wall inner surface, by means of heat or cooling applied to the outer surface of the catalytic reactor tube wall. The metal radiation surfaces break up the boundary flow region of the process fluid near the inner surface of the catalytic reactor tubes and increases the surface area, which increases the internal heat transfer from the inner surface of the catalytic reactor tubes to the process fluid flowing within the catalytic reactor tubes.

BRIEF DESCRIPTION OF THE DRAWING

FIG. 1 shows a catalytic reactor according to an embodiment of the application.

DETAILED DESCRIPTION

1. Catalytic reactor 1 comprising a combustion reaction chamber which comprises a plurality of catalytic reactor tubes 2 and at least one burner 3 for producing at least one combustion reaction, said catalytic reactor tubes are at least partly filled with catalyst elements, characterised in that the combustion reaction chamber further comprises one or more metal radiation surfaces 4 said metal radiation surfaces are
arranged between the catalytic reactor tubes
having a length of at least half the length of the catalytic reactor tubes
arranged with at least a part of the metal radiation surface in a distance from the burner small enough to enable heat absorption from the combustion reaction to the metal radiation surface,
whereby the metal radiation surfaces improve the heat transfer and/or even out the heat transfer profile from the combustion reaction to the catalytic reactor tubes and the catalyst elements during operation of the catalytic reactor.

2. Catalytic reactor according to feature 1, wherein said metal radiation surfaces are woven metal radiation surfaces.
3. Catalytic reactor according to any of the preceding features, wherein said metal radiation surfaces are made of metal gauze.
4. Catalytic reactor according to any of the preceding features, wherein said metal radiation surfaces have a length of 80% to 100% of the length of the catalytic reactor tubes.
5. Catalytic reactor according to any of the preceding features, wherein said metal radiation surfaces are arranged so near at least one of said burners that a flame of the burner will make flame attachment to the radiation surfaces.
6. Catalytic reactor according to any of the preceding features, wherein said metal radiation surfaces are arranged within a flame of at least one of said burners.
7. Catalytic reactor according to any of the preceding features, wherein said metal radiation surfaces are arranged as curtains and attached at their top and bottom within said combustion reaction chamber.
8. Catalytic reactor according to any of the preceding features, wherein the metal radiation surfaces comprise a catalytic active coating.
9. Catalytic reactor according to any of the preceding features, wherein the metal radiation surfaces are coated with a catalytic active material.
10. Catalytic reactor according to any of the preceding features, wherein said catalytic reactor is a steam reformer, a methanol reactor, a formaldehyde reactor or an ethylene cracker.

Example 1

A metal wire gauze (or metal sheets) is placed in the furnace box in between tube rows so the direction of the top or bottom burners will be directed along the gauze (preferably divided in two sides by the gauze). The gauze is designed to cover the whole area or there will be made holes, depending on the desired radiation for the specific vertical position. This way the radiation from a solid surface can be varied to obtain a desired radiation profile for the reformer tube having a significant part of the heat released to the gauze conducted to other parts. The gauze is also attached to the lower part in the furnace in order to control the horizontal position to the centre between the reformer tubes. The gauze will be attached by wires connected to anchors both made of high temperature materials placed in the top of the furnace box either in the roof or on the sides close to the top.

Example 2

In a revamp for a top-fired reformer, the capacity is boosted by obtaining a more even temperature profile along the reformer tubes, which has a significant impact on reformer tube life time. The combustion flames are stabilized by attaching these to an internal surface preventing the risk of flame attachment to the tubes minimizing operation risks. As peak temperature in the combustion flame also is be reduced, also the NOx formation in the furnace is lowered. Overall a significant increase in the produced synthesis gas/hydrogen from the reformer is obtained.

The invention claimed is:

1. Catalytic reactor comprising a combustion reaction chamber which comprises a plurality of catalytic reactor tubes and at least one burner for producing at least one combustion reaction, said catalytic reactor tubes are at least partly filled with catalyst elements, wherein the combustion reaction chamber further comprises one or more metal radiation surfaces, said metal radiation surfaces are
   arranged between the catalytic reactor tubes
   having a length of at least half the length of the catalytic reactor tubes
   arranged with at least a part of the metal radiation surfaces in a distance from the burner small enough to enable heat absorption from the combustion reaction to the metal radiation surfaces,
   wherein the metal radiation surfaces are either woven metal radiation surfaces or made of metal gauze,
   whereby the metal radiation surfaces improve the heat transfer and/or even out the heat transfer profile from the combustion reaction to the catalytic reactor tubes and the catalyst elements during operation of the catalytic reactor,
   wherein said metal radiation surfaces are arranged so near the at least one burner that a flame of the burner will make flame attachment to the radiation surfaces.

2. Catalytic reactor comprising a combustion reaction chamber which comprises a plurality of catalytic reactor tubes and at least one burner for producing at least one combustion reaction, said catalytic reactor tubes are at least partly filled with catalyst elements, wherein the combustion reaction chamber further comprises one or more metal radiation surfaces, said metal radiation surfaces are
   arranged between the catalytic reactor tubes
   having a length of at least half the length of the catalytic reactor tubes
   arranged with at least a part of the metal radiation surfaces in a distance from the burner small enough to enable heat absorption from the combustion reaction to the metal radiation surfaces,
   wherein the metal radiation surfaces are either woven metal radiation surfaces or made of metal gauze,
   whereby the metal radiation surfaces improve the heat transfer and/or even out the heat transfer profile from the combustion reaction to the catalytic reactor tubes and the catalyst elements during operation of the catalytic reactor,
   wherein said metal radiation surfaces are arranged within a flame of the at least one burner.

* * * * *